United States Patent
Goransson

[15] 3,664,187
[45] May 23, 1972

[54] TRANSDUCER FOR MEASURING MECHANICAL FORCES

[72] Inventor: Nils Paul Goransson, Hjulsbro, Sweden
[73] Assignee: Saab-Scania Aktiebolag, Linkoping, Sweden
[22] Filed: June 3, 1970
[21] Appl. No.: 43,120

[52] U.S. Cl. .................................. 73/141 A, 73/DIG. 2
[51] Int. Cl. ................................................ G01l 1/12
[58] Field of Search ............... 73/133 B, 141 A; 336/20; 324/34 MA

[56] References Cited

UNITED STATES PATENTS

| | | | |
|---|---|---|---|
| 3,453,876 | 7/1969 | Radus | 73/141 A |
| R26,739 | 12/1969 | Stucki | 73/398 |
| 3,168,830 | 2/1965 | Chass | 73/398 |
| 3,372,580 | 3/1968 | Chass | 73/141 |
| 3,469,440 | 9/1969 | Lofgren | 73/88.5 |
| 2,895,332 | 7/1959 | Dahle | 73/141 |

FOREIGN PATENTS OR APPLICATIONS

| | | | |
|---|---|---|---|
| 1,151,820 | 5/1969 | Great Britain | 73/133 B |
| 740,762 | 9/1943 | Germany | 73/133 B |
| 182,933 | 9/1966 | U.S.S.R. | 73/133 B |
| 663,541 | 5/1963 | Canada | 73/133 B |

Primary Examiner—James J. Gill
Attorney—Ira Milton Jones

[57] ABSTRACT

A transducer has a body of ferromagnetic material to which force to be measured is applied to produce, by magnetostriction, changed distribution of magnetic flux induced in the body by an a.c. energized primary embracing it. The body has a hole large enough to insure high stress concentrations upon application of force. An even number of secondaries are wound through smaller holes and around edge portions of the body. Half of the secondaries embrace zones of tension stress, the other half zones of compression stress.

6 Claims, 4 Drawing Figures

PATENTED MAY 23 1972 3,664,187

INVENTOR
Nils Paul Göransson
BY  
ATTORNEY

TRANSDUCER FOR MEASURING MECHANICAL FORCES

This invention relates to transducers for converting mechanical forces to electrical signals, so that the magnitudes of the forces can be measured; and the invention is concerned more specifically with a transducer which utilizes magnetostriction in a body of ferromagnetic material for the purpose of causing electrical output signals from the transducer to vary with mechanical forces applied to the body.

The phenomenon of magnetostriction can be defined as the change in permeability (magnetic conductivity) of a ferromagnetic body, or a portion thereof, in response to change in mechanical stress in the body. In the case of silicon steel such as is used for transformer laminations, for example, permeability increases with tension stresses and decreases with compresion stresses. This effect can be utilized in a mechanical force transducer in which a ferromagnetic body serves as a sort of core for inductively coupled windings.

Several types of such transducers are known. In general, every such device comprises a body of ferromagnetic material so arranged that a force to be measured can be applied to it to produce stresses in it, a primary winding adapted to be energized with alternating current and coupled with the body so as to induce therein a flux that varies in density in different parts of the body in accordance with the stresses in the body, and secondary winding means coupled with the body and so disposed with respect to the body that magnetostrictive variations in the distribution of flux in the body cause corresponding changes in the alternating current induced in the secondary winding means.

One such device is disclosed in U.S. Pat. No. 3,168,830, to J. Chass, issued Feb. 9, 1965. Others are disclosed in Swedish Pats. Nos. 180,348 and 226,586.

The object of the present invention is to provide a mechanical force transducer of the above described character that is both more compact and more sensitive than any heretofore available, and which, moreover, has high linearity and accuracy throughout its measuring range, but which nevertheless possesses to the fullest extent the important characteristics of sturdiness, simplicity and low cost.

In general the object of the invention is achieved by the provision of a transducer comprising a body of ferromagnetic material in which there is a single relatively large hole and certain smaller holes spaced to opposite sides of the larger hole, a primary winding or charging coil wound around a portion or portions of the body, and an even number of secondary windings or detector coils, each wound through one of said smaller holes and around an edge on the body, the secondary windings being so arranged that half of them embrace zones of tension stress and the other half embrace zones of compression stress.

With these observations and objectives in mind, the manner in which the invention achieves its purpose will be appreciated from the following description and the accompanying drawing, which exemplifies the invention, it being understood that such changes in the specific apparatus disclosed herein may be made as come within the scope of the appended claims.

Figure 1:
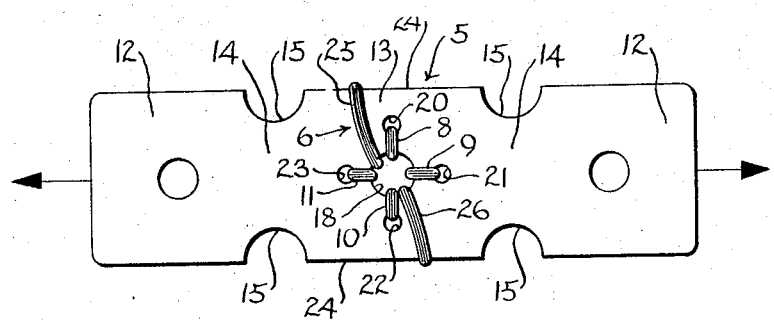
FIG. 1 is a plan view of a transducer embodying the principles of this invention and intended for measuring tension forces.

Referring now to the accompanying drawings, and first considering the embodiment of the invention that is illustrated in FIG. 1, the numeral 5 designates generally a body of ferromagnetic material which is arranged to be subjected to mechanical tension forces to be measured and which cooperates with a primary winding or charging coil 6 and with a plurality of secondary windings or detector coils 8, 9, 10 and 11.

The body 5 can be formed of any suitable ferromagnetic material, but for purposes of illustration it can be assumed to be made of a silicon alloy steel of the type commonly used for transformer core laminations. The body can comprise a single sheet or plate of ferromagnetic material or can be made up of a number of identical laminations that are cemented or otherwise flatwise fastened together. In any event, the body 5 that is illustrated in FIG. 1 is elongated and has apertured tabs or lugs 12 at its opposite ends that are adapted to be mechanically connected, respectively, with a tension force applying means and with a fixed structure or other means for applying to the body a reaction to the tension force. The body is generally rectangular, but the lugs 12 are connected with its central portion 13 by necks 14 that are defined by pairs of opposite bays 15 in the longer opposite outer edges 24 on the body.

It is a feature of the transducer of this invention that the central portion 13 of the transducer body, which constitutes the body proper, has a relatively large central hole 18 therein. This hole, which defines an inner edge on the body, is large enough so that upon the application to the body of force to be measured, relatively high stresses are produced in the body adjacent to its edge portions; but the hole 18 must not be so big that any force within the measurement range for which the transducer is intended can cause permanent deformation of the body.

The body 5 of the transducer illustrated in FIG. 1 also has four smaller holes therein, designated 20, 21, 22 and 23. These are equispaced from the larger hole 18, at locations described hereinafter, and each of the detector coils 8–11 is wound through one of the smaller holes and through the larger hole 18.

Upon the application of tension force to the lugs 12, stresses are produced in the body proper 13 in zones adjacent to its edges, and in this case the zones of stress that are of primary interest are those adjacent to the inner edge that defines the hole 18. Tension forces on the body can be visualized as tending to deform the hole 18 from circular to elliptical, with the major axis of the ellipse oriented lengthwise of the body. Hence it will be seen that adjacent to the hole 18 there are tension stresses in the zones bounded by edge portions of said hole that are more nearly parallel to the opposite longitudinal outer edges 24 of the body, while compression stresses will exist in the body along edge portions of said hole that are more nearly transverse to said outer edge.

The primary winding or charging coil 6 is so arranged that it induces a flux in the body that is normal substantially symmetrical with respect to the large hole 18. To this end the charging coil can comprise a number of turns of insulated conductor wound through the large hole 18 and around one longitudinal outer edge 24 of the body, as at 25, and an equal number of turns of the same conductor wound through said hole 18 and around the opposite outer edge 24 of the body, as at 26. When the body is in relaxed condition, the flux induced therein by the charging coil can be visualized as distributed in circular flux lines concentric to the hole 18. When the body is under tension, the effect of magnetostriction can be visualized as deforming the lines of flux into ellipses having their major axes extending lengthwise of the body.

The secondary windings or detector coils 8–11 are so arranged that each embraces a zone of high stress, and that half of them embrace zones of tension stress and the other half embrace zones of compression stress. To this end two of the smaller holes, designated 20 and 22, are spaced to opposite sides of the hole 18 and have their centers on a line which extends through the center of the large hole and transversely to the longitudinal outer edges 24, while the other two smaller holes, designated 21 and 23, are likewise spaced to opposite sides of the larger hole but have their centers on a line through the center of the large hole that extends parallel to the longitudinal outer edges 24. It will be noted that detector coils 8 and 10, which are respectively wound through smaller holes 20 and 22, extend substantially along the first of the lines just mentioned, while coils 9 and 11, wound through holes 21 and 23, extend substantially along the second mentioned line.

It will also be noted that detector coils 8 and 10 embrace zones of tension stress while coils 9 and 11 embrace zones of compression stress.

It will be seen that the detector coils are so arranged that with the body in relaxed condition equal densities of magnetic flux can be linked with all of them. Hence the current through coils 8 and 10 can normally be equal to that through coils 9 and 11 but of opposite sign, so that the several coils can be so connected with a read-out instrumentality (not shown) as to normally impress a net zero current upon it. With tension force applied to the body, and visualizing the lines of flux deformed to elliptical shape as above described, it will be apparent that a higher than normal e.m.f. will be induced in detector coils 8 and 10, since they will be linked with more lines of flux, while a lower than normal current will be induced in coils 9 and 11, which will be linked with fewer than normal lines of flux. The net voltage difference between windings 8 and 10 on the one hand and windings 9 and 11 on the other hand will be in linear relation to the tension force applied to the body.

It will be apparent that the provision of detector coils linked with zones of both tension stress and compression stress affords a high sensitivity to the transducer of this invention, in that its net output voltage undergoes a substantially large change for a small change in the magnitude of applied force. Of course the sensitivity of the device is also due in some substantial measure to the provision of the large hole 18, which insures relatively high concentrations of stresses in the zones embraced by the several detector coils.

It will be understood that the detector coils can be connected with one another and with a read-out device in various arrangements; but the provision of four detector coils lends itself nicely to connection of the coils in a bridge circuit which not only affords a high output signal but also achieves thermal balance without the need for special temperature compensating devices external to the transducer, such as have been needed with prior force measuring devices.

Figure 2:
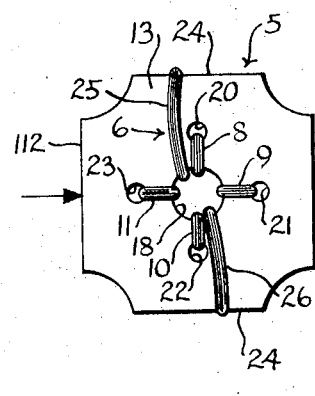
FIG. 2 is a plan view of a transducer of the invention intended for measuring compression forces.

The embodiment of the invention illustrated in FIG. 2, which is intended for measuring compression forces, is essentially the same as that illustrated in FIG. 1, except that the tension lugs 12 are replaced in FIG. 2 by surface portions 112 to which compression and reaction forces can be applied. The description of FIG. 1 applies in all respects to FIG. 2, except that the imaginary ellipses mentioned in that description will have their major axes perpendicular to the outer edges 24 in FIG. 2. Consequently, if the FIG. 2 apparatus were connected with read-out means in exactly the same manner as the apparatus of FIG. 1, force measurements would be given in terms of negative values. Obviously readings could be obtained in terms of positive values by mere reversal of leads, but it will be apparent that a transducer of this invention can be adapted for measuring both tension and compression forces, with the sign of its output then signifying the character of the force being applied to the transducer.

Figure 3:
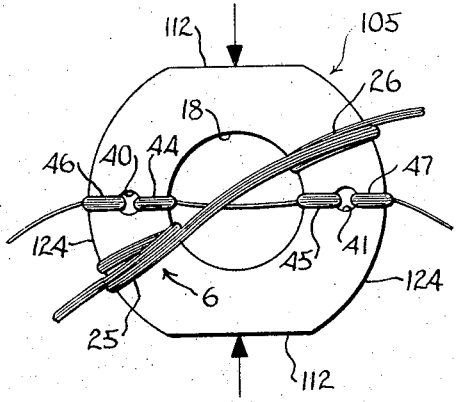
FIG. 3 illustrates another form of transducer of this invention intended for measuring compression forces.

The further modified embodiment of the invention illustrated in FIG. 3 is particularly adapted for measurement of compression forces. Here the body 105 is generally annular, with its inner circumference defining the large hole 18, but the roundness of its outer periphery is interrupted to provide a pair of opposite flat surface portions 112 to which compression and reaction forces are respectively applied. Such forces tend to deform the annular body toward an ellipse having its major axis coinciding with a line parallel to said surfaces 112 and midway between them; and consequently zones of compression stress are produced along the inner edge of the body near said line, while zones of tension stress are produced along the outer edges 124 of the body and near the same line. There are only two smaller holes 40 and 41 in the body 105, spaced to opposite sides of the large hole 18, centered on the line just mentioned and each located midway between the inner and outer edges of the body so as to be at points of substantially zero stress.

The primary winding or charging coil 6 in FIG. 3 again consists of two groups of turns, designated 25 and 26, each wound through the large hole 18 and around an outer edge 124 of the body. The four detector coils 44–47 all lie substantially along the line mentioned above. Two of the detector coils, designated 44 and 45, are respectively wound through the smaller holes 40 and 41 and around the inside edge of the body, to embrace the zones of compression stress. The other two detector coils, designated 46 and 47, are respectively wound through the smaller holes 40 and 41 and around the outer edges 124 of the body, so as to embrace the zones of tension stress. It will be apparent that for the purposes of compression force measurement, comparison is made as between the currents induced in coils 44 and 45 on the one hand and coils 45 and 47 on the other hand.

Figure 4:
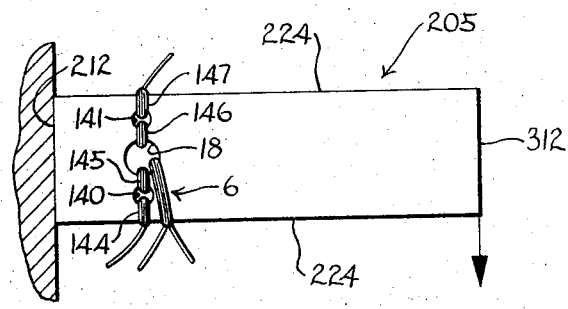
FIG. 4 illustrates a transducer embodying the invention that is intended for measuring bending moments.

FIG. 4 illustrates the principles of this invention embodied in a transducer for measuring bending moments, which in this case is shown as having an elongated rectangular body 205 that is anchored to suitable fixed supporting means at one of its end portions 212 and is adapted to have a force applied to its other end portion 312, which force is in a direction transverse to its elongated outer edges 224. Assuming that the bending force is applied downwardly, as shown, tension stresses are produced in the upper half of the body and compression stresses are produced in its lower half, the tension stresses being greatest along the upper edge 224 and the compression stresses being greatest along the lower edge 224. The position of the large hold 18 lengthwise along the body is not critical, but its center should be midway between the upper and lower edges 224, along the line of zero or balanced stress. Because of the presence of the hole 18, the imposition of bending force upon the body brings about high stress concentrations in those parts of the material of the body that lie between the hole 18 and each of the outer edges 224.

In this case the primary winding or charging coil 6 consists of a single set of turns of insulated conductor wound through the hole 18 and around one of the outer edges 224.

There are, again, only two of the smaller holes, designated 140 and 141, spaced to opposite sides of the large hole 18 on a line that extends through its center and transversely to the outer edges 224. The exact locations of the holes 140 and 141 along the line just mentioned are not critical, but they should be equispaced from the hole 18 and each is preferably midway between its adjacent outer edge 224 and the adjacent edge portion of the hole 18.

Assuming that downward bending force is applied to the body, as indicated in FIG. 4, the lower detector coils 144 and 145 will embrace zones of compression stress while the upper coils 146 and 147 will embrace zones of tension stress. Further, the stresses in the zones embraced by the inner coils 145 and 146 will be lesser magnitude than those in the zones embraced by the outer coils 144 and 147. The detector coils are of course so connected with read-out means that currents induced in the lower coils 144 and 145 are balanced against those induced in the upper coils 146 and 147 to produce a net current signal which has a magnitude proportional to the magnitude of the applied bending force and a sign corresponding to the direction of that force.

It will be recognized that in any of the herein illustrated embodiments of the invention only two detector coils could be employed, so long as one of them embraced a zone of compression stress and the other a zone of tension stress; and similarly more than two detector coils could be arranged to embrace zones of each type. In general, the number of detector coils embracing zones of tension stress should be equal to the number of such coils embracing zones of compression stress, and the detector coils should be so located that upon the application of force to the body there will be a reasonable balance of the respective tension and compression stresses in the zones embraced by such coils.

From the foregoing description taken with the accompanying drawing it will be apparent that this invention provides a mechanical force measuring transducer which is both compact and inexpensive but which is nevertheless capable of producing an accurately linear output signal with a relatively large variation in net output voltage for a small variation in applied force.

Those skilled in the art will appreciate that the invention can be embodied in forms other than as herein disclosed for purposes of illustration.

The invention is defined by the following claims:

I claim:

1. A transducer comprising a body of ferromagnetic material adapted to be subjected to mechanical force to be measured and means for utilizing magnetostriction to afford a measurement of such force, said transducer being characterized by:
    A. the body of ferromagnetic material
        1. having opposite portions to which force to be measured and the force reacting thereto are respectively applied,
        2. having a pair of opposite outer edges,
        3. having a circular hole therethrough defining inner edges on the body, said hole being between said opposite portions and substantially midway between said pair of opposite outer edges, and said hole being small enough so that the elastic limits of the body will not be exceeded under the application of the highest expectable force thereto, but large enough to assure production of substantially high concentrations of tension and compression stresses in the material of the body upon application thereto of a force to be measured, there being a zone of maximum tension stress adjacent to one edge portion of the body and a zone of maximum compression stress adjacent to another edge portion thereof, and
        4. said body also having at least two smaller holes, each spaced from the first mentioned hole, one of said smaller holes being so located that the zone of maximum tension stress lies between it and said one edge portion and the other being so located that the zone of maximum compression stress lies between it and said other edge portion;
    B. a charging coil embracing the body and adapted to be energized with alternating current, said charging coil being arranged to induce magnetic flux in the body that normally threads said zones of maximum stresses; and
    C. an even number of detector coils, each wound through one of said smaller holes and around one of said edge portions, there being at least one of said detector coils embracing each of said zones, and there being as many detector coils embracing portions of the body in which tension stresses are produced as there are embracing portions in which compression stresses are produced.

2. The transducer of claim 1, further characterized by:
    A. one of said smaller holes being located substantially midway between said outer edges; and
    B. another of said smaller holes being centered on a line transverse to said outer edges and through the center of the first mentioned hole.

3. The transducer of claim 1, further characterized by:
    A. there being a first pair of said smaller holes of which each hole is located substantially midway between said outer edges, the two holes of said pair being equispaced to opposite sides of the first mentioned hole;
    B. there being a second pair of said smaller holes, the holes of said second pair being centered on a line which is transverse to a line through the centers of the smaller holes of the first mentioned pair and which extends substantially through the center of the first mentioned hole; and
    C. each of the detector coils being wound through one of the smaller holes and around the edge on the body that is defined by the first mentioned hole.

4. The transducer of claim 1 wherein the body is annular except for opposite straight and parallel outer edge portions providing said portions to which forces are applied, further characterized by:
    A. there being a pair of said smaller holes in the body, centered on a line through the center of the first mentioned hole and parallel to said parallel outer edge portions; and
    B. there being a pair of detector coils through each of said smaller holes, substantially on the last mentioned line, one of which is wound around the edge of the body defined by said first mentioned hole and the other of which is wound around an outer curved edge portion of the body.

5. The transducer of claim 1 wherein said body is elongated and said opposite portions are near the opposite ends thereof and are adapted to have forces applied to them in directions such that the body is subjected to bending moments, said opposite outer edges extending lengthwise of the body so that the application to the body of force to be measured produces maximum tension stress near one of said outer edges and maximum compression stress near the other one, further characterized by:
    A. there being two of said smaller holes in the body at opposite sides of the first mentioned hole, on a line substantially through the center of the first mentioned hole and generally transverse to said opposite outer edges; and
    B. there being a pair of detector coils wound through each of said smaller holes, one of which is wound around its adjacent one of said opposite outer edges on the body and the other of which is wound through the first mentioned hole so that all of said detector coils are arranged substantially along the last mentioned line.

6. A force measuring transducer of the type comprising a body of ferromagnetic material having opposite portions to which opposing mechanical forces to be measured can be applied, a.c. energizable primary winding means arranged to induce in the body a flux, the distribution of which undergoes magnetostrictive variation with the application of changing force to the body, and secondary winding means in flux linking relation to the body and wherein currents are induced that vary in correspondence with applied force, said transducer being characterized by: A. the body having
    1. a pair of opposite outer edges extending between said portions, and
    2. a circular hole therethrough, midway between said edges and intermediate said portions, said hole defining an inner edge on the body,
        a. said hole being small enough so that the elastic limits of the body will not be exceeded under the application of the highest expectable force to the body, but
        b. large enough to assure production of substantially high concentrations of tension and compression stresses in the material of the body upon application thereto of a force to be measured, and
        c. so located in the body that said stresses are at maxima in zones that adjoin portions of said edges, at least one of said zones being along an edge portion of said hole, and
    3. the body also having an even number of smaller holes, each spaced from the first mentioned hole, there being at least one of said smaller holes adjacent to one of each of said zones, spaced from the edge portion which the zone adjoins; and
B. the secondary winding means comprising an even number of secondary windings, each wound through one of said smaller holes and around one of said edge portions on the body,
    1. there being at least one secondary winding embracing each of said zones of maximum stress, and
    2. there being as many secondary windings embracing zones of tension stress as there are embracing zones of compression stress.

* * * * *